United States Patent Office 3,322,507
Patented May 30, 1967

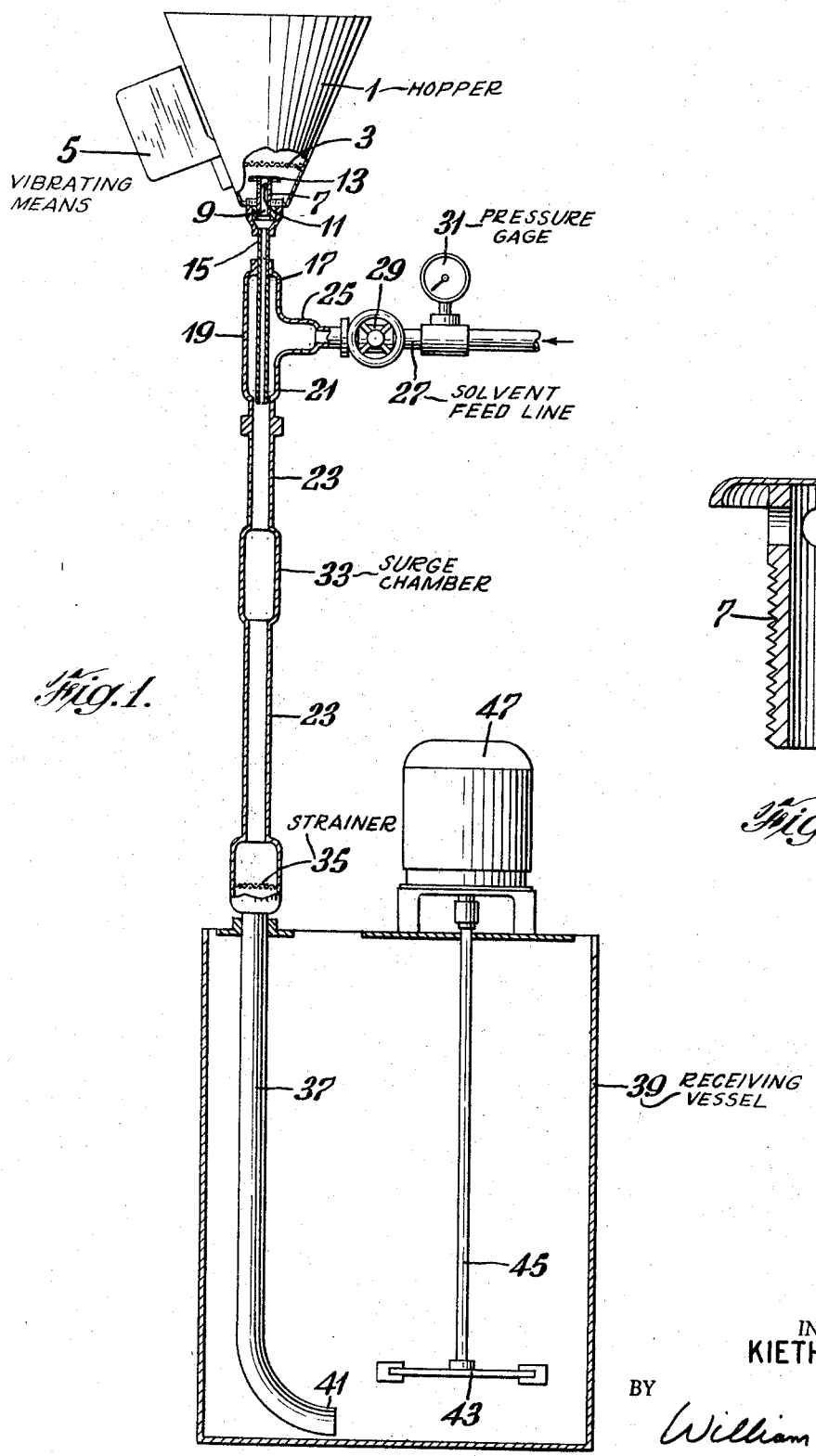

3,322,507
APPARATUS FOR DISSOLVING SOLID POLYMERIC SUBSTANCES IN A SOLVENT
Keith L. Smith, Charleston, W.Va., assignor to Union Carbide Corporation, a corporation of New York
Filed June 11, 1963, Ser. No. 286,968
2 Claims. (Cl. 23—267)

This invention relates to a method of dissolving solid polymeric substances or resins and an apparatus therefor. It is particularly concerned with a method of producing solutions of high molecular weight, difficultly-soluble solid polymeric materials and a novel apparatus for carrying out the same.

Heretofore, the preparation of solutions of high molecular weight resins has been accomplished with great difficulties. One difficulty has been due to the formation of a viscous dispersion at an early stage of the dissolving operation. In order to dissolve the resin in a solvent, the resin must be rapidly and effectively wetted by the solvent and simultaneously dispersed therethrough to obtain a homogeneous solution. It is a matter of common experience, however, that the higher the viscosity of the dispersion, the less efficient the wetting of the resin particles and the more difficult it is to disperse the resin in the solvent. These difficulties are more pronounced in cases of high molecular weight resins since they tend to form a very viscous dispersion at low concentrations and at an early stage of the dissolving operation. When a viscous dispersion is so formed, the dissolution of the resin will proceed at a low rate and much of the resin tends to agglomerate into large gels which are even more difficult to disperse and dissolve than the resin starting materials since the gels are much larger than the original resin particles. In order to effectively disperse and dissolve these gels resort must be had to powerful, high-shear agitators, but this requires expensive equipment, and it also causes mechanical degradation of the resin.

Several methods have heretofore been employed for preparing solutions of high molecular weight, difficultly-soluble resins. One fairly common method employs an internally baffled vessel equipped with a high-shear agitator. The agitator breaks-up the gels into smaller, more readily dispersable particles, and the baffles serve to promote turbulence within the vessel, thereby causing effective wetting and dissolution of the resin particles and preventing localized over-concentration. The use of high-shear agitator, however, suffers the disadvantages which were previously mentioned.

In another method, the resin particles are first dispersed in a liquid medium in which the resin is insoluble or very sparingly soluble, and the resulting dispersion is then added to a second liquid medium in which the resin is readily soluble. A solution of the resin in the second liquid (solvent) is thus obtained without the danger of agglomeration or gel formation. However, this method requires additional process steps since it employs two liquid media, one for dispersing and the other for dissolving the resin particles, and the dispersing medium must be removed after the dissolving operation.

With some high molecular weight resins such as, for example, poly(ethylene oxide) still another method has been employed. For example, poly(ethylene oxide) is practically insoluble in boiling water but is soluble in cold water. If dissolved initially in cold water, a viscous dispersion will be formed as soon as some poly(ethylene oxide) becomes dispersed, hence presenting the type of problems which were previously discussed. The resin is, therefore, first dispersed in boiling water in which the resin, as was previously said, is practically insoluble. The resulting dispersion of poly(ethylene oxide) in water is then allowed to cool slowly. Upon cooling of the dispersion, the resin particles will dissolve in the solvent (water) and a solution of poly(ethylene oxide) in water is thus formed without the danger of agglomeration and gel formation of the resin particles. However, as it can be appreciated this procedure is very time-consuming since the solvent must first be heated to its boiling temperature, the resin dispersed therethrough and the dispersion then cooled back to room temperature. Furthermore, the heating of a good many liquids require extreme precautions due to possible fire hazards.

Accordingly, the present invention aims at providing a method and an apparatus for preparing solutions of high molecular weight, difficultly-soluble resins without any of the foregoing disadvantages and limitations. It provides a novel method and apparatus whereby the resin and the solvent are effectively admixed at controlled rates and whereby the resin is rapidly and effectively wetted by the solvent and dissolves therein to form a resin solution without the danger of agglomeration and gel formation, and without the necessity of using high-shear agitators.

The method and the apparatus of this invention are more clearly comprehended with reference to the accompanying drawings wherein:

FIGURE 1 is a schematic diagram of the novel apparatus in which the method of this invention is carried out.

FIGURE 2 is an enlarged side view of the resin feed valve shown in FIGURE 1.

Figure 3:
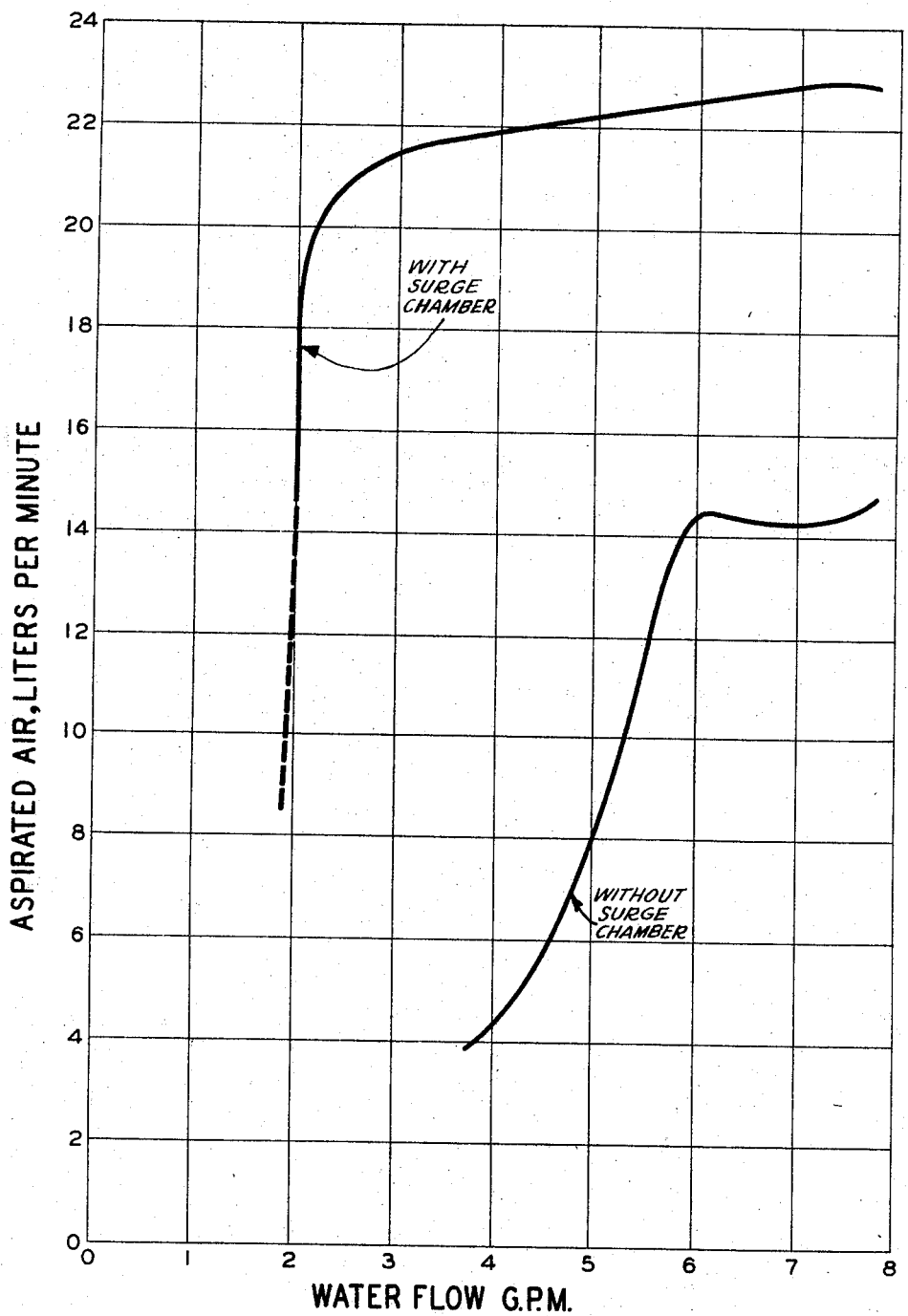
FIGURE 3 is a plot of aspirated air flow in liters per minute, versus the rate of flow of solvent (water) in gallons per minute.

Although the method and apparatus of this invention will be described using poly(ethylene oxide) resin, and water as the solvent for the resin, it should be pointed out that the instant invention is applicable to a host of other resin-solvent systems wherein agglomeration and gel formation present difficulties of the type heretofore described.

Ethylene oxide polymers which are suited for the present invention are those having a reduced viscosity value of at least about 0.5 and upwards of about 75, or higher, or having an aqueous viscosity at 25° C. of from about 225 centipoises, measured at a 5 weight percent concentration, to about 12,000 centipoises, and higher, measured at 1 weight percent solution.

By the term "reduced viscosity" is meant a value obtained by dividing the specific viscosity by the concentration of the polymer in solution, the concentration being measured in grams of polymer per 100 milliliters of solvent at a given temperature. The term is regarded as a measure of molecular weight. The specific viscosity is obtained by dividing the difference between the viscosity of the solution and the viscosity of the solvent by the viscosity of the solvent. Unless stated otherwise, the reduced viscosities herein referred to are measured at a concentration of 0.2 gram of polymer in 100 milliliters of water at 30° C. Also, unless otherwise stated herein, the reduced viscosity of the olefin oxide polymer, particularly homopolymers of ethylene oxide and copolymers thereof, is a value in the range of at least 0.5 and upwards to 75, and higher.

The terms "aqueous viscosity," or "bulk viscosity" as employed herein, refer to the viscosity of the stated concentration of polymer in water, as measured on a Model RVF Brookfield Viscometer using a No. 1 spindle operated at 2 revolutions per minute, unless otherwise stated. The viscosity is measured at ambient room temperatures, that is, about 24° C.

Referring to the drawings, there is shown a conical hopper 1 containing poly(ethylene oxide) resin particles, a removable screen 3 disposed horizontally inside said hopper as shown, a vibrating means 5 attached externally to said hopper and adapted to vibrate the same to cause the resin to flow through said removable screen 3 into a resin feed valve 7 which is disposed at the apex of the hopper 1 and is suitably attached thereto by known means.

The resin feed valve comprises a perforated member such as a perforated tube 9 having one or more circumferentially arrayed apertures 11 near the upper end thereof. The desired number, size and geometrical arrangement of these apertures will be discussed hereinafter in more detail. A flat member such as, for example, a flat metal piece shaped to form an "umbrella-like" structure, hereafter referred to as umbrella 13 is disposed horizontally across the top of said perforated tube 9 and may be welded thereto or attached by some other means. The ends of umbrella 13 extend somewhat beyond the outside diameter of perforated tube 9 as shown in FIGURES 1 and 2. The umbrella 13 serves to prevent the accumulation and packing of the resin near the apertures 11, which otherwise interferes with or prevents the flow of resins therethrough.

Extending down from the apex of the hopper 1 is a resin tube inlet 15 which may be suitably attached to the perforated tube 9. The resin inlet tube 15 enters the arm 17 of a T-shaped member hereafter referred to as T 19, and extends substantially centrally therein, terminating at or near the junction defined by the arm 21 of T 19 and the upper end of tail pipe 23. The leg 25 of T 19, is connected to a conduit 27 through which water flows in the manner to be described hereinafter in connection with the description of the method of this invention. The inside diameter of the leg 25 of T 19 is at least equal and preferably larger than the inside diameter of the arms 17 and 21 of said T so that the liquid is actually flowing from a larger area into a smaller area, thereby creating liquid turbulence and aspirated action in said arms. A valve 29 (gate, globe, etc.) and a pressure gauge 31 are installed in conduit 27 in order to regulate the rate of flow of water and to measure the pressure of the flowing liquid stream. Conduit 27 originates from a water reservoir (not shown).

Tail pipe 23 is an elongated tube or pipe having an enlarged section hereafter referred to as surge chamber 33, located some distance below the junction defined by the upper end of tail pipe 23 and the lower end of arm 21 of T 19. The use of a surge chamber, as will be seen, constitutes an important feature of the present invention. Likewise, the relative dimensions of the surge chamber 33 and tail pipe 23 also constitute important features of this invention.

A replaceable strainer 35 is placed at the lower end of tail pipe 23 near the entrance of delivery tube 37 into vessel 39. The delivery tube 37 may be a further extension of tail pipe 23 or it may be separately attached thereto. The delivery tube 37 extends vertically down through and near the side of vessel 39 and is slightly curved at its lower end 41 to discharge the resin solution toward the impeller 43 of agitator 45 which facilitates agitation of the resin solution and maintains a homogeneous solution in said vessel. The agitator 45 may be driven by a motor 47.

In operation, water flows through the conduit 27 at a predetermined rate regulated by valve 29, and the pressure in this conduit is measured by the pressure gauge 31. Water thus flows from the leg 25 of T 19 into the arms 17 and 21 of said T, i.e., from a larger into a smaller area. It is a well-known principle of fluid flow that the flow of liquid from a larger area into a smaller area is accompanied by an increase in the liquid velocity and a corresponding decrease in fluid pressure. Thus the velocity of liquid flowing through the smaller area is higher, and correspondingly, the fluid pressure is smaller than in the larger area. Thus the water velocity in arm 21 of said T is increased and the pressure is decreased. By proper control of the water flow rate therefore, it is possible to achieve some degree of tubulence in the arm 21, particularly at the point of discharge of the resin from the resin inlet tube 15. At the same time, the pressure at this point is sufficiently lowered so as to induce the flow of resin from the hopper 1 through the apertures 11 of the resin feed valve 7 down through the resin inlet tube 15. To this end it is preferable to maintain the hopper under slight positive pressure to insure ready flow of the resin therefrom. This resin flow is caused by the aspiration action which is induced by the flow of water in the manner heretofore described which creates a pressure differential between the hopper and the area defined by the junction of the lower end of resin inlet tube 15 and the upper end of tail pipe 23.

The resin which thus flows from the hopper 1 down through the resin inlet tube 15 discharges at the area defined above and is there mixed with a turbulent water stream, disperses and dissolves in the water and flow down through tail pipe 23 and delivery tube 37 into vessel 39. There is little or no agglomeration of the resin. Any agglomerates which may be formed are removed by the replaceable strainer 35. The resin solution is agitated mildly in vessel 39 to maintain it in a homogeneous state throughout this operation.

The hopper 1 is continuously vibrated throughout the foregoing operation to insure adequate flow of resin through the removable screen and the apertures in the resin feed valve. As was previously discussed the umbrella 13 prevents accumulation and packing of the resin near the apertures in the resin feed valve which otherwise obstructs the flow of resin. The removable screen 3 serves the same purpose.

It has been discovered that by increasing the flow rate of water through conduit 27, it is possible to induce greater aspiration action and hence a better flow of resin from the hopper 1. Furthermore, as the flow rate of water through conduit 27 is increased, greater turbulence is created at the area of discharge of the resin inlet tube. This increased turbulence of the water stream results in effective wetting, dispersing and dissolving of resin particles in the water stream.

It has been unexpectedly discovered that the presence of a surge chamber in the tail pipe improves the aspiration action which is induced in the manner heretofore described. The following example (Example 1) illustrates the effect of surge chamber on the aspiration efficiency.

*Example 1*

Two series of runs were conducted using the apparatus shown in FIGURE 1 except that the top of the resin inlet tube was connected to a standard wet-test meter and a liquid manometer. No hopper or resin feed was employed in this example.

In the first series of runs (1 to 7) no surge chamber was employed but in the second series of runs (8 to 14) a surge chamber was employed as shown in FIGURE 1. Water was introduced at various controlled rates through conduit 27 and the water rate was adjusted and controlled through a one-inch gate valve which was installed in conduit 27. The pressures corresponding to the various water flow rates were measured by a pressure gauge installed in conduit 27 upstream of the gate valve. The flow of water through T 19 produced an aspiration action in the T and induced the flow of air through the wet-test meter. The air flow through the wet-test meter was measured for each corresponding water flow rate through conduit 27. The results are summarized in Table 1 below.

ber to the inside diameter of the tail pipe below the surge chamber is also at least about 1.6:1 and the ratio of the length of the tail pipe above and below the surge chamber to the respective inside diameters of the tail pipe varies from about 30:1 to about 60:1.

It has been further found that the aspirated air flow

TABLE 1

| Run No. | Tail Pipe Dimensions, Inches | | | | | Surge Chamber Dimensions, Inches | | Water Back Pressure, p.s.i.g. | Aspirated Air Flow, Liters/Minute |
|---|---|---|---|---|---|---|---|---|---|
| | Total Length | Length Above Surge Chamber | Length Below Surge Chamber | Diameter Above Surge Chamber | Diameter Below Surge Chamber | Inside Diameter | Length | | |
| 1 | 48 | ---- | ---- | 3/4 | 3/4 | ---- | ---- | 0 | 15.2 |
| 2 | 48 | ---- | ---- | 3/4 | 3/4 | ---- | ---- | 10 | 14.6 |
| 3 | 48 | ---- | ---- | 3/4 | 3/4 | ---- | ---- | 20 | 14.6 |
| 4 | 48 | ---- | ---- | 3/4 | 3/4 | ---- | ---- | 30 | 12.2 |
| 5 | 48 | ---- | ---- | 3/4 | 3/4 | ---- | ---- | 40 | 4.0 |
| 6 | 48 | ---- | ---- | 3/4 | 3/4 | ---- | ---- | 45 | ---- |
| 7 | 48 | ---- | ---- | 3/4 | 3/4 | ---- | ---- | 49 | ---- |
| 8 | 48 | 3 | 43 | 3/4 | 3/4 | 1 1/8 | 2.0 | 0 | 17.3 |
| 9 | 48 | 3 | 43 | 3/4 | 3/4 | 1 1/8 | 2.0 | 10 | 17.1 |
| 10 | 48 | 3 | 43 | 3/4 | 3/4 | 1 1/8 | 2.0 | 20 | 17.3 |
| 11 | 48 | 3 | 43 | 3/4 | 3/4 | 1 1/8 | 2.0 | 30 | 17.2 |
| 12 | 48 | 3 | 43 | 3/4 | 3/4 | 1 1/8 | 2.0 | 40 | 17.1 |
| 13 | 48 | 3 | 43 | 3/4 | 3/4 | 1 1/8 | 2.0 | 45 | 16.5 |
| 14 | 48 | 3 | 43 | 3/4 | 3/4 | 1 1/8 | 2.0 | 49 | 14.8 |

From Table 1 it can be observed that the use of a surge chamber in the tail pipe markedly improves the aspiration action induced by the flow of water in the system. This is indicated by the increased rate of air flow through the wet-test meter in the foregoing example. Furthermore, the rate of aspirated air flow remains substantially constant over a wide range of water flow rates. These improved results are further illustrated by the curves in FIGURE 3.

Referring to FIGURE 3, the lower curve is a plot of aspirated air flow in liters per minute (measured by a wet-test meter as in Example 1), versus the flow rate of water through the system in gallons per minute, without the use of a surge chamber in the tail pipe. The upper curve is a similar plot obtained by using a surge chamber in the tail pipe located approximately a distance of 5 tail pipe diameters below the upper end of the tail pipe. Comparison of the two curves indicates the improved results which are obtained by using a surge chamber in the tail pipe. It is seen that the use of a surge chamber increases the rate of air flow through the wet-test meter and that the level of the aspirated air flow is markedly higher than in the case of using a straight tail pipe without a surge chamber. Furthermore the upper curve indicates a uniform and constant rate of air flow over a wide range of water flow through the system. These results indicate that the presence of a surge chamber in the tail pipe will increase the resin flow rate when the apparatus of the invention is used for preparing resin solution.

While the use of a surge chamber in the tail pipe unexpectedly improves the aspiration efficiency of the novel apparatus regardless of the location and the relative dimensions of the surge chamber, it has been found that there are certain geometrical configurations which result in optimum performance and aspiration efficiency. It has been found that moderately high but essentially uniform aspirated air flow can be obtained over a wide range of water flow rates through the system when the ratio of the inside diameter of the tail pipe above the surge chamber to the inside diameter of the tail pipe below the surge chamber is about 1.0, the inside diameter of the surge chamber is at least about ½ the length of the surge chamber, the ratio of the inside diameter of the surge chamber to the inside diameter of the tail pipe above the surge chamber is at least about 1.6:1, the ratio of the inside diameter of the surge chamcan be increased even further than that achieved by the foregoing geometrical configuration though at the cost of sacrificing uniformity of the aspirated air flow rate. Thus very high rates of aspirated flow of air or other fluids can be achieved when the ratio of the inside diameter of the tail pipe below the surge chamber to the ratio of the tail pipe diameter above the surge chamber is from about 1.2:1 to about 1.4:1, preferably about 1.3:1, while the other geometrical configurations are substantially the same as heretofore described.

It should be emphasized that while these geometrical configurations optimize the performance of the novel apparatus, they are not necessarily critical to the operability of the present invention. Some deviations from these geometrical configurations are permissible without departure from the spirit or scope of the instant inventions.

The location of the surge chamber in the tail pipe is not narrowly critical though it has been discovered that improved aspiration action, hence better flow of resin, can be achieved when the surge chamber is located a distance of from about 2 to 15 tail pipe inside diameters, preferably 5 to 10 tail pipe inside diameters below the upper end of the tail pipe (corresponding to the lower end of the resin inlet tube as shown in FIGURE 1).

Although the maximum rate of flow of resin from the resin hopper into the resin feed valve is controlled by the magnitude of the aspiration action induced by the flow of water into the system, yet for each given water flow rate there is a corresponding resin flow rate which can be accommodated by providing adequate numbers of equal-size apertures in the resin feed valve. It is therefore possible to prepare solutions of different resin concentrations by varying the number of apertures through which the resin can flow. This is illustrated by Example 2 below.

*Example 2*

The apparatus employed for carrying out this experiment was substantially the same as that shown in FIGURE 1. A 6-mesh screen was used in the resin hopper and an 8-mesh replaceable strainer was placed in the tail pipe as shown in FIGURE 1. The resin feed valve contained 4 equally-spaced, circumferentially arrayed apertures, each having an inside diameter of 3/16 inch to permit the passage of the resin particles.

Water was introduced at the rate of 7.2 gallons per minute and the time required for 1500 grams of resin to flow through the resin feed valve was determined to be 2 minutes and 30 seconds. One of the apertures was then closed (plugged), and the time required for 1500 grams of resin to flow through the resin feed valve, at the same water rate of 7.2 gallons per minute, was determined to be 2 minutes and 49 seconds. This experiment was continued at the same water rate but at two and one open apertures available for the resin flow respectively. The times required for 1500 grams of resin to flow through the resin feed valve were about 3 minutes and 36 seconds, and 6 minutes and 9 seconds respectively.

The number of apertures which are necessary to accommodate the flow of resin of course depends upon the maximum rate of flow of resin from the hopper into the resin feed valves. Sufficient number of apertures must ordinarily be provided to permit the flow of the expected maximum quantity of the resin for a given rate of water flow. The apertures may be circumferentially arranged in the resin feed valve in one or more rows or rings spaced near the upper end of the resin feed valve. This is illustrated by Example 3 below.

*Example 3*

The procedure of this example was the same as that in Example 2 except that the apertures in the resin feed valve were arranged circumferentially in rows (or rings) with each ring containing 8 equal size apertures of 3/16 inch inside diameter. The water flow rate was at the rate of 7.2 gallons per minute and the time required for a given quantity of resin to flow through the resin feed valve was determined as in the previous example. The results are summarized in Table 2 below.

TABLE 2

| Quantity of resin, grams | Time required for the resin flow, sec. | Number of rings in the resin feed valve |
| --- | --- | --- |
| 1,500 | 110 | 2 |
| 1,500 | 104 | 3 |
| 1,500 | 62 | 4 |

It is essential in the operation of the present invention that the system be air-tight and leak-proof, otherwise the aspiration efficiency of the system will be greatly reduced. It is therefore important to test all joints before the operation to insure that they are all air-tight.

As was previously mentioned the apparatus and the method of this invention are not necessarily limited to water as the solvent, nor are they limited to the use of poly(ethylene oxide) resin. Other solvents and resins can be employed with equally efficacious results. The particle size of the resin is not narrowly critical as the diameter of the apertures can be varied to accommodate the flow of resin particles therethrough. In fact even pelleted resins can be employed so long as the diameter of the apertures is sufficiently large to permit passage of the pellets.

Example 4 below illustrates the preparation of a solution of acrylonitrile-sulfonium acrylate copolymer resin in water. Water is once again used as a solvent due to the practical convenience of handling the same in the laboratory.

*Example 4*

The apparatus employed in this example was the same as that shown in FIGURE 1. The resin feed valve contained 4 equally-spaced, circumferentially arrayed apertures each having 3/16 inch diameter. A 6-mesh screen was placed in the resin feed hopper which was filled with 1500 grams of −10 mesh resin (copolymer of acrylonitrile and sulfonium acrylate).

Water was introduced at the rate of 7.2 gallons per minute and the vibrator was turned on to facilitate the flow of resin from the hopper. The time required for all the resin to flow out of the hopper was determined to be 2 minutes and 25 seconds and the resulting solution was 2.23 percent in concentration.

While the structural features and component parts of the novel apparatus have heretofore been described with certain degrees of particularity, it should be pointed out that many modifications and revisions may be contemplated without departing from the principles set forth by this invention. For example, instead of the tee member shown in FIGURE 1, it is possible to employ a truncated member or any other member through which water can flow from a larger area into a smaller area, to thereby create turbulence and aspirated action which can be utilized to induce the flow of resin and the mixing thereof with the liquid solvent.

The materials of construction of the novel apparatus are of course dependent upon the end use thereof. It is understood, of course, that corrosion-resistant materials of construction are to be employed whenever the use of corrosive solvents is contemplated.

What is claimed is:

1. An apparatus for dissolving solid resinous materials which comprises, in combination, a conical resin feed hopper, means for vibrating said hopper, a resin feed valve disposed at the apex of said hopper and attached thereto, said resin feed valve comprising a generally vertical tubular member having at least one aperture circumferentially located near the upper end thereof, and an umbrella-like member disposed horizontally across said vertical tubular member, an elongated vertical tubular member attached to and downwardly extending from the apex of said hopper and communicating with said resin feed valve, a tee member comprising a leg and two arms, said leg being horizontally disposed and integrally attached to and communicating with said arms and adapted to introduce solvent therein, one of said arms extending generally vertically below and the other extending generally vertically above said leg, said arms being arranged concentrically about and adapted to receive said downwardly extending elongated tubular member which passes substantially centrally through said arms and terminates adjacent the lower end of said lower arm, said upper arm being sealed at its upper end about said downwardly extending elongated tubular member, a conduit connected to said leg of said tee member and adapted for the passage of solvent therethrough, a second conduit connected to the lower arm of said tee member, said second conduit having a length-to-inside diameter ratio of from about 30:1 to about 60:1 and terminating into a receiving vessel at the bottom thereof, a surge chamber located in said second conduit, said surge chamber having an inside diameter-to-length ratio of at least about ½ and being disposed below the upper end of said second conduit a distance of from about 2 to about 15 times the inside diameter of said second conduit, the inside diameter of said second conduit above the surge chamber being substantially the same as the inside diameter of said second conduit below the surge chamber and the ratio of the inside diameter of said surge chamber to the inside diameter of said second conduit above and below said surge chamber being at least about 1.6:1.

2. An apparatus according to claim 1 in which the ratio of the inside diameter of said second conduit above the surge chamber to the inside diameter of said second conduit below the surge chamber is from about 1.1:1 to about 1.5:1.

References Cited

UNITED STATES PATENTS

| 966,389 | 8/1910 | Durant | 23—271 |
| 1,857,630 | 5/1932 | Erickson | 23—312 |

(Other references on following page)

FOREIGN PATENTS

| | | | |
|---|---|---|---|
| 2,120,003 | 6/1938 | Schanz | 22—193 |
| 2,802,724 | 8/1957 | Johnson | 23—267 |
| 2,874,032 | 10/1955 | Kuehner | 23—267 |
| 2,926,154 | 2/1960 | Keim | 260—29.2 |
| 3,060,141 | 10/1962 | Black | 260—29.2 |
| 3,094,249 | 6/1963 | Pullen | 222—193 |
| 3,129,064 | 4/1964 | Harvey | 23—271 |
| 3,164,443 | 1/1965 | Watson | 23—267 |

NORMAN YUDKOFF, *Primary Examiner.*

MURRAY TILLMAN, *Examiner.*

S. J. EMERY, *Assistant Examiner.*